(12) United States Patent
Soerensen

(10) Patent No.: US 11,600,983 B2
(45) Date of Patent: Mar. 7, 2023

(54) INTERFACE, METHOD AND SYSTEM FOR CONNECTING ELECTRICAL ELEMENTS

(71) Applicant: Siemens Gamesa Renewable Energy A/S, Brande (DK)

(72) Inventor: Johnny Soerensen, Videbaek (DK)

(73) Assignee: SIEMENS GAMESA RENEWABLE ENERGY A/S

(*) Notice: Subject to any disclaimer, the term of this patent is extended or adjusted under 35 U.S.C. 154(b) by 55 days.

(21) Appl. No.: 17/224,169

(22) Filed: Apr. 7, 2021

(65) Prior Publication Data

US 2021/0320487 A1    Oct. 14, 2021

(30) Foreign Application Priority Data

Apr. 14, 2020 (EP) .................................. 20169416

(51) Int. Cl.
*H02G 15/23* (2006.01)
(52) U.S. Cl.
CPC .................................. *H02G 15/23* (2013.01)
(58) Field of Classification Search
CPC .................................................. H02G 15/23
USPC ........................................................ 174/20
See application file for complete search history.

(56) References Cited

U.S. PATENT DOCUMENTS

| | | | |
|---|---|---|---|
| 2,881,241 A * | 4/1959 | Stecher | H02G 15/013 439/449 |
| 8,809,681 B2 * | 8/2014 | Madden | H02G 9/12 174/47 |
| 9,091,146 B1 * | 7/2015 | Whiddon | E21B 43/013 |
| 2006/0231283 A1 | 10/2006 | Stagi et al. | |
| 2016/0209601 A1 | 7/2016 | Ilzumi et al. | |
| 2017/0003455 A1 | 1/2017 | Cairns | |

FOREIGN PATENT DOCUMENTS

| | | |
|---|---|---|
| CN | 101208832 A | 6/2008 |
| CN | 108352653 A | 7/2018 |
| DE | 202012000063 U1 | 4/2013 |
| GB | 2560798 * | 1/2017 |
| GB | 2560798 A | 9/2018 |
| TW | 201630259 A | 8/2016 |
| WO | WO 2019184101 A1 | 10/2019 |

* cited by examiner

*Primary Examiner* — Timothy J Thompson
*Assistant Examiner* — Michael F McAllister
(74) *Attorney, Agent, or Firm* — Schmeiser, Olsen & Watts LLP

(57) ABSTRACT

Provided is an interface for connecting a cable arranged in a shell to a receiving structure, the interface including: a connector including a connection area for fixing the connector to a cable support of the receiving structure and a transmission area for receiving the cable and the shell, a lower seal, an upper seal, a chamber element configured to coat the cable between the lower seal and the upper seal. Also provided is a hang-off system and a method for connecting a cable arranged in a shell to a receiving structure.

15 Claims, 4 Drawing Sheets

INTERFACE, METHOD AND SYSTEM FOR CONNECTING ELECTRICAL ELEMENTS

CROSS-REFERENCE TO RELATED APPLICATIONS

This application claims priority to European Application No. 20169416.3, having a filing date of Apr. 14, 2020, the entire contents of which are hereby incorporated by reference.

FIELD OF TECHNOLOGY

The following relates to an interface, a method and a hang-off system for connecting a number of electrical elements, such as offshore installations, for example.

BACKGROUND

Offshore installations, such as electricity producing installations and in particular wind turbines, can be connected to onshore and/or to neighboring offshore installations using multiple but separate electrical subsea cables. For offshore wind turbines, normally three electrical cables are used for such a connection, i.e. one single core cable for each electrical phase.

However, today it is very common to use cable types that are based on single cables comprising multiple electrical power cables which are individually isolated from one another. This cable type is advantageous, as an installation time can be reduced by e.g. laying only one cable on a sea bed and/or pulling only a single cable from seabed to an offshore installation. Cables of this cable type are referred to as multicore cables or umbilical cables, with multiple cables or tubes placed within an outer layer for protection and for holding the cable together. Umbilical cables include not just power conductor cables but also cables or tubes for communication and data transfer purposes, such as optical cables, low voltage cables or components for fluid or gas transport.

According to ISO-standard 13628-5:2009, the term 'umbilical' is defined as a "group of functional components, such as electrical cables, optical fiber cables, hoses and tubes, laid up or bundled together or in combination with each other, that generally provides hydraulics, fluid injection, power and/or communication services". Either type, such cables may be armored cables, as is also known from single core cables, as to protect the cable when laying in or at a seabed, using a metal mesh or steel wires surrounding the inner cables/tubes and/or provide ballast to the cable and prevent it from floating.

A problem with electrical sub-sea cables placed in a water environment, especially a salty water environment, is the presence and migration of water and gas along their electrical cable conductor. Water and gas can permeate through polymer shells and insulation layers and then migrate along the cable conductor to end terminations or cable junction boxes, where they potentially lead to cable failure. Gas, e.g. hydrogen can also migrate to the cable termination points, potentially creating hazards if not vented away. Possible sources of hydrogen are polymer degradation and metallic outgassing as well as corrosion; in this last case, hydrogen can be generated by self-corrosion of the metallic components in contact with sea water, for example outer armor wires.

GB 2560798 A describes a subsea power cable hang-off which uses a combination of gaskets, flanges and sealing systems that are based on an interaction with steel wires of an armor of a cable, in order to avoid the use of a marine grade resin to provide an airtight seal.

SUMMARY

An aspect relates to a reliable transmission link between offshore generators. In particular, it is an aspect of embodiments of the invention disclosed herein to provide for a possibility to connect offshore generators and/or floating structures with unarmored cables.

The aspect is solved by an interface, a method and a hang-off system for connecting a cable arranged in a shell to a receiving structure. Thereby, the features and details described in connection with the system apply in connection with the method described herein, so that the disclosure of the individual aspects of embodiments of the invention can be referred to one another.

According to a first aspect of embodiments of the invention, the above described aspect is solved by an interface for connecting a cable arranged in a shell to a receiving structure. The interface comprises a connector comprising a connection area for fixing the connector to a cable support of the receiving structure and a transmission area for receiving the cable and the shell. The interface further comprises a lower seal comprising an elastic element that expands in a radial direction when being compressed, an upper seal comprising an elastic element that expands in a radial direction when being compressed, and a chamber element configured to coat the cable between the lower seal and the upper seal. The chamber element is configured to form a gas chamber between an inner core of the cable and an inner surface of the chamber element for collecting gases streaming out of the cable, in particular out of a space between an outer layer of the cable and the inner core of the cable. The lower seal is configured to seal a space between an outer surface of the cable and the shell. The upper seal is configured to seal a space between a sealing area on the inner surface of the chamber element above the gas chamber and the inner core of the cable.

In the context of embodiments of the present invention, a seal is an element that is configured for sealing of a space against a stream of a fluid, such as hydrogen, for example.

In the context of embodiments of the present invention, a fluid tight connection is a connection that prevents streaming of fluids, such as hydrogen, for example, from one side of the connection to another side of the connection.

In the context of embodiments of the present invention, a gas chamber is a space where a gas, such as hydrogen, for example, is accumulated. In an embodiment, the gas chamber according to embodiments of the present invention is located at a location where the gases accumulated therein do not make any damage to a particular cable.

In the context of embodiments of the present invention, a cable support is a structure for receiving, guiding and holding a cable in a receiving structure. A cable support may be a pipe made from steel that guides a cable extending therethrough on given trajectory, for example.

The interface described herein is based on the principle that a gas chamber is formed for receiving gases streaming out of a cable. Therefore, a complete cable, i.e. an inner core of the cable surrounded by an outer layer enters the interface and only the inner core exits the interface, such that gases streaming within in the cable are accumulated in the gas chamber.

For accumulating gases streaming within a cable, the cable together with a shell in which the cable is arranged, is led through a cable support of a particular receiving structure, such as an offshore wind turbine, a substation or any other offshore structure, for example. Then, the cable is led through a connector. The connector may be secured to the cable support using fasteners, such as bolts or screws. For connection with the cable support, the connector may have a connection area such as a flange with slots for receiving bolts or screws, for example.

Additionally, the shell in which the cable is arranged may be secured at the connector by welding or by using any other connection technique, such as bolts or screws. For securing the shell at the connector, the connector may have a securing area, such as a welding surface or a flange with slots for receiving bolts or screws, for example.

When the shell is secured at the connector, a cable arrangement comprising a cable and a shell is led into the connector, but only the cable is led out of the connector.

Alternatively, the connector may be adapted to guide the cable together with the shell towards the chamber element.

In order to avoid gases or other fluids streaming out of a space between the cable and the shell, a lower seal is used. The connector and the lower seal may be connected by flanges and/or a mechanically fitting structure that ensures a fluid tight connection.

Further, a gas chamber is formed by a chamber element, which may be cylinder-shaped and made from non-magnetic steel and/or a plastic. The chamber element may have flanges and/or interfaces for providing a fluid tight connection with other elements, such as the lower seal, the upper seal and/or the connector. The gas chamber facilitates a housing for the cable, in particular for an inner-core of the cable.

The gas chamber formed by the chamber element serves as a reservoir for accumulating gases floating through the cable, thereby protecting other areas, in particular gas-sensitive elements of the cable and/or a particular receiving structure, from damage. Further, the accumulated gases may be used for harvesting energy by burning or converting the gases.

Depending on the length or sort of a particular cable to be connected, the shape of the gas chamber and the chamber element may be adapted in order to provide for a volume large enough to accumulate gases for a given service interval, such as one year, for example.

Alternatively, the chamber element may be adapted in order to provide for a volume large enough to accumulate gases for a lifetime of a particular receiving structure.

According to an example, the chamber element is configured to envelop both, a first part of the cable, where an outer layer of the cable is present and a second part of the cable, where the outer layer of the cable is stripped off and only the inner core is present.

In particular, the chamber element is configured to form a gas chamber between an inner core of the cable and the inner surface of the chamber element. Thus, an outer layer of a particular cable may be stripped off before it enters the gas chamber. Alternatively, the outer layer of a particular cable may be stripped off within the gas chamber, such that the gas chamber coats both, a first area in which the inner core of the cable is covered by the outer layer and a second area in which the inner core of the cable is not covered by the outer layer.

In order to provide for a fluid tight sealing of the gas chamber, the upper seal may be connected to the chamber element by a flange and/or a mechanically fitting structure that ensures a fluid tight connection, for example.

According to an example, the upper seal is shaped to connect with the inner core of the cable in a positive form locking and sealing connection.

The upper seal is configured to provide for a fluid tight connection with an inner core of a particular cable coming out of the gas chamber. Thus, the upper seal may have a recess in an inner area of the upper seal that is shaped to positively fit to the inner core.

Optionally, the upper seal may comprise an inner sealing element that is configured to seal a tolerance space between the upper seal and an inner core of a particular cable.

In particular, the upper seal may comprise separate recesses for separate elements of the inner core of a particular cable, such as particular cables for particular phases and/or components for fluid or gas transport. Each of these separate recesses may comprise an inner sealing element that is configured to seal a tolerance space between the upper seal and a particular element of the inner core of a particular cable.

According to an example, the upper seal and/or the lower seal are configured to extend in a linear direction in a mounting stage, when there is no compression force applied on a particular seal and to extend further in a radial direction than in the mounting stage when a compression force is applied on the particular seal.

In order to provide for a sealing of the gas chamber that keeps the gas chamber fluid tight even under pressure, the upper seal and the lower seal each comprise an elastic element, such as rubber and/or plastic, that expands in a radial direction when being compressed. Thus, when a pressure compresses the upper seal and/or the lower seal, the elastic elements expand further in radial direction and therefore provide for a stronger connection of the particular seal with their surrounding structure.

Further, the elastic elements of the particular seals enable a comfortable and fast assembly of the interface disclosed herein, as the clamping force between the upper seal and the chamber element or between the lower seal and the shell/connector can be avoided when the particular seals are inserted in the chamber element or the shell/connector, respectively. As soon as the particular seals are in place, the seals can be engaged by compressing the seals using compression elements, such as screws driven through the seals, for example. As the compression elements tighten, a compression force is provided and the seal, i.e. the elastic element of the seal, expands in a radial direction, thereby providing a clamping force for sealing a space to be sealed.

According to an example, the upper seal and/or the lower seal comprise receiving sections for receiving compression elements that apply a compression force on the upper seal and/or the lower seal to expand the upper seal and/or the lower seal further in a radial direction.

By using receiving sections, compression elements, such as bolts or screws can be brought into the elastic elements of the particular seals without providing any damage to the elastic elements.

According to an example, the interface comprises a mechanical clamping element configured to be arranged between the shell in which the cable is arranged and the connector, and configured to provide for a clamping force to minimize movement of the shell in the connector.

By using a mechanical clamping element, such as a third seal, for example, movement of a cable arrangement in the interface can be minimized. The mechanical clamping element may be a mechanical brake or any other element that provides a friction force strong enough to minimize or to avoid movement of a cable arrangement in the interface, in particular in the connector.

According to an example, at least one, each of the connector element, the lower seal, the upper seal and the chamber element comprises at least a first part and a second part that are configured to be reversibly disassembled.

By using multi-part elements, i.e. seals, connectors and chamber elements that are assembled by two or more parts, the particular elements of the interface can be assembled and disassembled or demounted fast and easy. Thus, service of the interface and/or a particular cable, such as service for inspection under an OEM phase, can be carried out time and work efficient by merely disassembling one or all elements of the interface disclosed herein, such as the chamber element, for example, performing service work and reassembling the elements.

According to an example, the interface comprises an extension element for connecting the interface with a floating structure, wherein the extension element is configured to be arranged between the chamber element and the connector to provide for a space in which the cable can move when a load is applied on the cable.

By installing an extension element, such as an electrofusion coupler in the interface described herein, an additional space in which the cable can move when a load is applied on the cable can be provided. Thus, an extension element protects the interface from damage in case the cable is moved under high load caused by a movement of a floating structure, for example.

According to an example, the extension element comprises at least one stopper for stopping movement of the cable relative to the extension element.

By using a stopper, such as a mechanical barrier that limits a movement of the cable within the interface, damage of the interface by a wide movement of the cable can be avoided. A combination of an extension element and a stopper enables a particular cable to move within a space limited by the stopper in order to reduce a load applied on the cable. However, in case the cable moves too wide, such that further movement may cause damage in the interface, the movement of the cable is stopped.

According to an embodiment, the chamber element comprises an access interface, a plug, a valve or a membrane, for transmission of gas out of the gas chamber.

By using an access interface, gas accumulated in the gas chamber can leave the gas chamber. Thus, high pressure can be avoided and/or gas can be transferred to a gas processing instance, such as a tank, a burner, a turbine, a substation, a fuel cell or any other structure, in particular any other offshore structure.

In particular, the access interface may comprise a safety valve that automatically opens when a pressure inside the gas chamber is higher than a given threshold.

According to an example, the interface comprises a storage system for storing gas or a ventilation system for venting gas out in an environment, wherein the storage system or the ventilation system is connected to the access interface by a connection system.

By using a ventilation system, gases accumulated in the gas chamber can be vented out in an environment. Therefore, the interface may comprise a connection system, such as a number of pipes that guide the gases on their way to the environment or to a tank for storage of the gases.

According to a second aspect of embodiments of the present invention, a method for connecting a cable arranged in a shell to a receiving structure is disclosed. The method comprises an insertion step for inserting the cable together with the shell into a cable support of the receiving structure, a fixating step for fixing a connector surrounding the cable at the cable support, a first sealing step for arranging a lower seal between the shell and an outer surface of the cable, an assembling step for forming a gas chamber between an inner core of the cable and an inner surface of the chamber element for collecting gases streaming out of a space between an outer layer of the cable, by arranging a chamber element in an area of the cable above the lower seal, and a second sealing step for arranging an upper seal between a sealing area on the inner surface of the chamber element above the gas chamber and the inner core of the cable.

The method serves to connect a cable to a receiving structure using the interface disclosed herein. Thus, the features and details described in connection with the interface apply in connection with the method disclosed herein, so that regarding the disclosure of the individual aspects of embodiments of the invention, it is or can be referred to one another.

According to the method disclosed herein, the connector, the lower seal, the chamber element, the upper seal and/or any additional element may be arranged at the cable by pulling over an end of the cable and moving it along the cable to a predetermined place or by coating the cable using at least two separate elements that are connected.

According to an example, the method further comprises fixing the connector at the shell.

For connecting the connector and the shell in which a particular cable is arranged, the connector and the shell may be welded together at a welding area provided by the connector.

According to a third aspect, embodiments of the present invention relates to a hang-off system for connecting a number of elements. The hang-off system comprises an embodiment of the interface disclosed herein and a cable arranged in the interface.

Of course, the hang-off system may also comprise a shell of a cable as long as the shell is connected to the connection element.

The hang-off system disclosed herein in particular, comprises a cable without any wired armor. Thus, the hang-off system may comprise a three-phase electrical cable for providing electricity to a three-phase motor. Alternatively, the cable of the hang-off system may be any other cable, such as an umbilical cable. However, it is to be pointed out that the hang-off system according to embodiments of the present invention does not need a wiring element in the cable for connection the interface and the cable.

BRIEF DESCRIPTION

Some of the embodiments will be described in detail, with references to the following Figures, wherein like designations denote like members, wherein.

DETAILED DESCRIPTION

Figure 1:
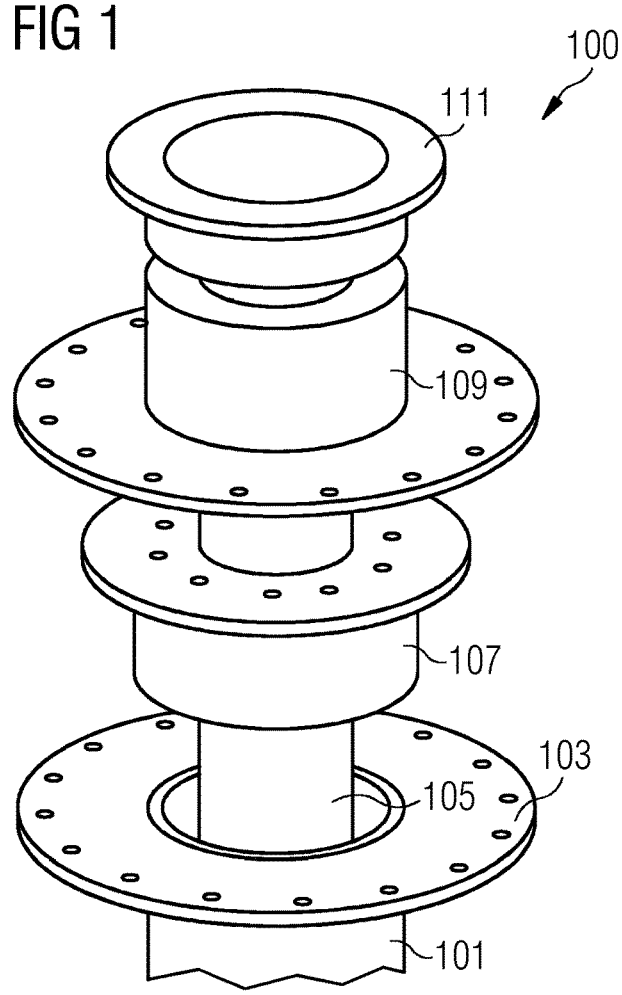
FIG. 1 shows an interface according to an embodiment of the present invention.

In FIG. 1, an interface 100 is shown. The interface 100 comprises a connector 101. The connector 101 comprises a connection area 103 for fixing the connector to a cable support of the receiving structure and a transmission area 105 for receiving a cable arranged in a shell.

Further, the interface 100 comprises a lower seal 107 configured to seal a space between an outer surface of the cable and the shell.

Moreover, the interface 100 comprises a chamber element 109 configured to coat the cable between the lower seal 107 and an upper seal 111. The chamber element 109 is further configured to form a gas chamber between an inner core of the cable and an inner surface of the chamber element 109 for collecting gases streaming out of a space between an outer layer of the cable and the inner core of the cable.

Additionally, the interface 100 comprises the upper seal 111. The upper seal 111 is configured to seal a space between a sealing area on the inner surface of the chamber element 109 above the gas chamber and an inner core of a cable.

Figure 2:
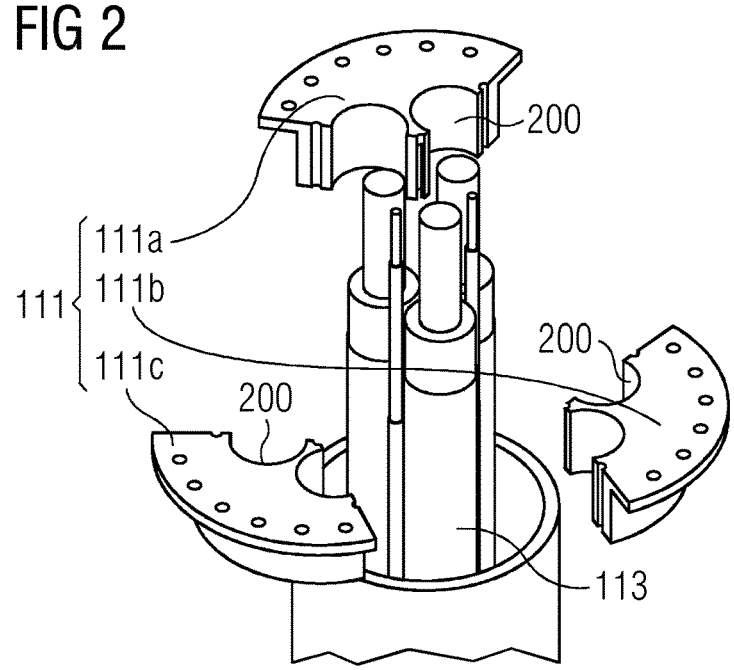
FIG. 2 shows a detailed view of an upper seal according to the embodiment shown in FIG. 1.

In FIG. 2, the upper seal 111 is shown. In the embodiment shown in FIG. 2, the upper seal 111 comprises three elements 111a, 111b and 111c that are configured to be brought into engagement to form the upper seal 111.

Further each of three elements 111a, 111b and 111c comprises part-recesses 200 for receiving an inner core 113 of a cable. Thus, the elements 111a, 111b and 111c are configured to positively fit to the inner core 113 and to seal the gas chamber formed beyond the upper seal 111 against an environment, when an inner core 113 of the cable extends therethrough, as shown in FIG. 3.

Figure 3:
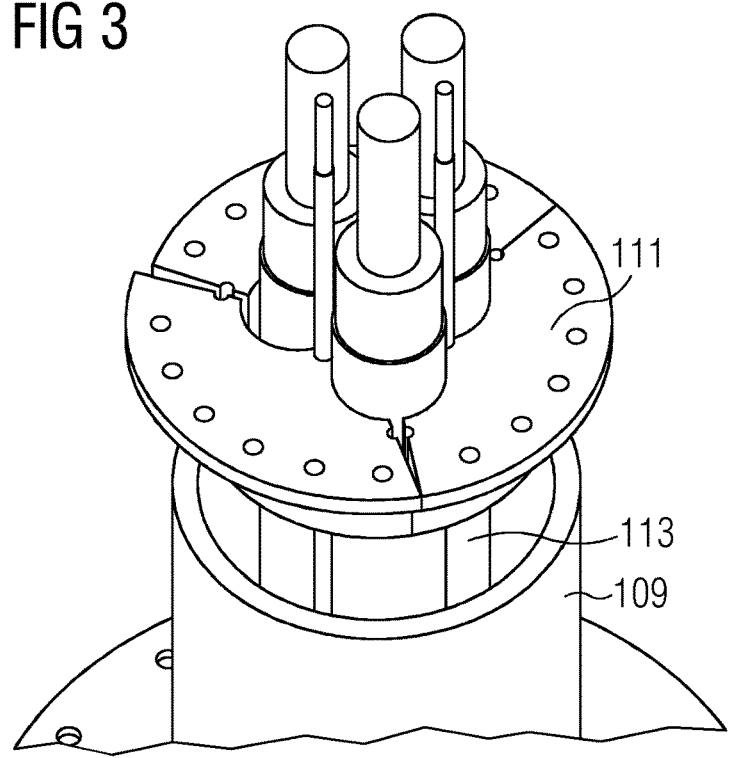
FIG. 3 shows the upper seal according to FIG. 2 in a closing position.

In FIG. 3, the elements 111a, 111b and 111c are brought into engagement around an inner core 113 of a cable. The upper seal 111 is configured to be brought into a fluid tight engagement with the chamber element 109, such that a gas chamber is formed between an inner surface of the chamber element 109, the inner core 113 of the cable and the lower seal 107, for example.

Figure 4:
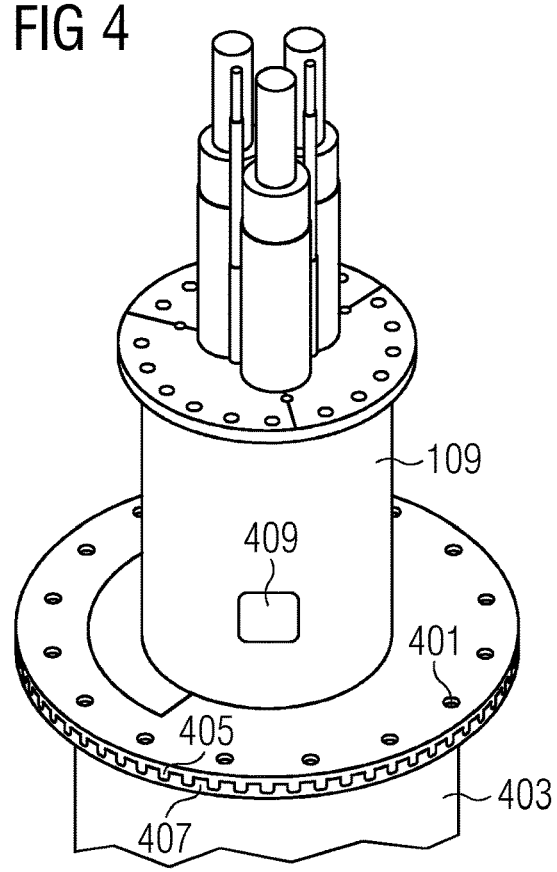
FIG. 4 shows a chamber element according to FIG. 1.

In FIG. 4, the chamber element 109 according to FIG. 1 is shown in detail. It can be seen that bolts 401 are tightening the chamber element 109 to the connector 101 and a cable support 403 of a receiving structure.

Further, optional rubber extensions 405 are shown that are brought into engagement with corresponding extensions 407 of the connector 101 or the lower seal 107, which in FIG. 4 is covered by the cable support 403, for sealing an inner space of the interface 100 against an environment.

Optionally, the chamber element 109 comprises an access interface 409, such as a plug, a valve or a membrane, for transmission of gas out of the gas chamber formed by the chamber element 109.

Figure 5:
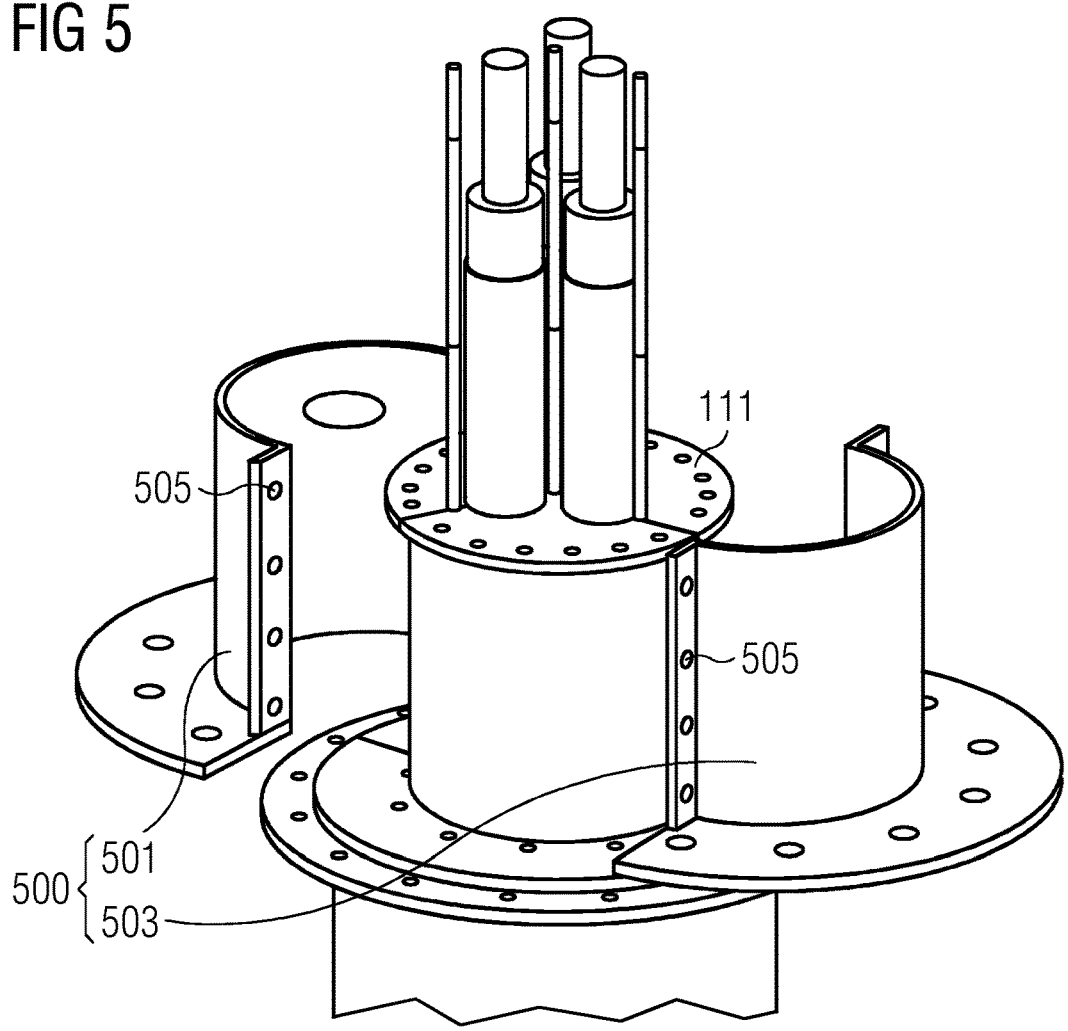
FIG. 5 shows a chamber element according to another embodiment of the interface, according to embodiments of the present invention.

In FIG. 5, a chamber element 500 is shown. The chamber element 500 comprises a first element 501 and a second element 503. The first element 501 and the second element 503 can easily be assembled and disassembled by tightening or loosening screws in the slots 505.

As the first element 501 and the second element 503 are combined, the upper seal 111 can be brought into engagement with the chamber element 500 from above, such that a gas chamber is formed under the upper seal 111 in the chamber element 500. The chamber element 500 may be made from non-magnetic steel in order to minimize building of gases by the chamber element 500 itself.

Thus, service of the interface 100 or a cable extending through the interface 100 can be carried out easily by disassembling and reassembling the chamber element 500.

Figure 6:
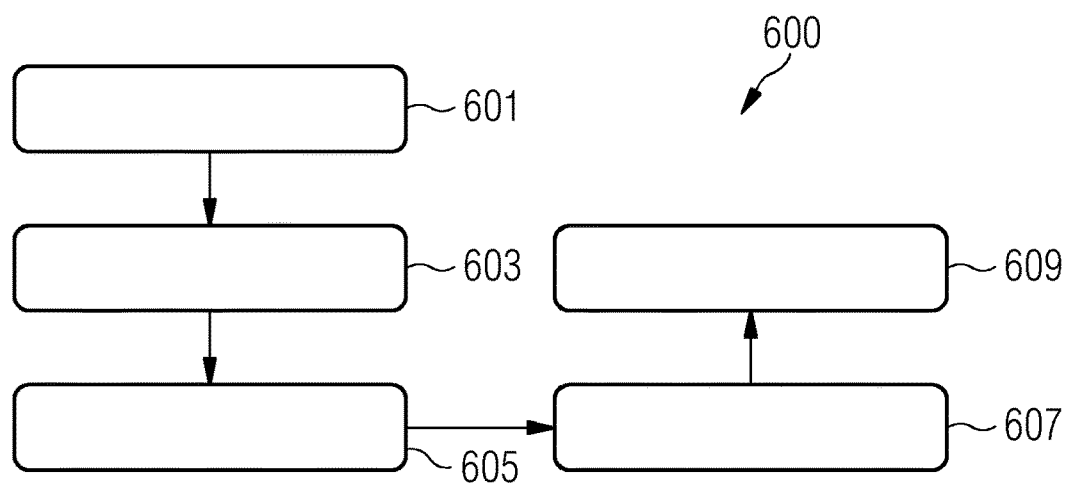
FIG. 6 shows a method according to an embodiment of the present invention.

In FIG. 6, a method 600 according to an embodiment of the method disclosed herein is shown.

The method 600 comprises an insertion step 601 for inserting the cable together with the shell into a cable support of the receiving structure, a fixating step 603 for fixating a connector surrounding the cable at the cable support, a first sealing step 605 for arranging a lower seal between the shell and an outer surface of the cable, an assembling step 607 for forming a gas chamber between an inner core of the cable and an inner surface of the chamber element for collecting gases streaming out of the cable, by arranging a chamber element in an area of the cable above the lower seal, and a second sealing step 609 for arranging an upper seal between a sealing area on the inner surface of the chamber element, above the gas chamber, and the inner core of the cable.

Figure 7:
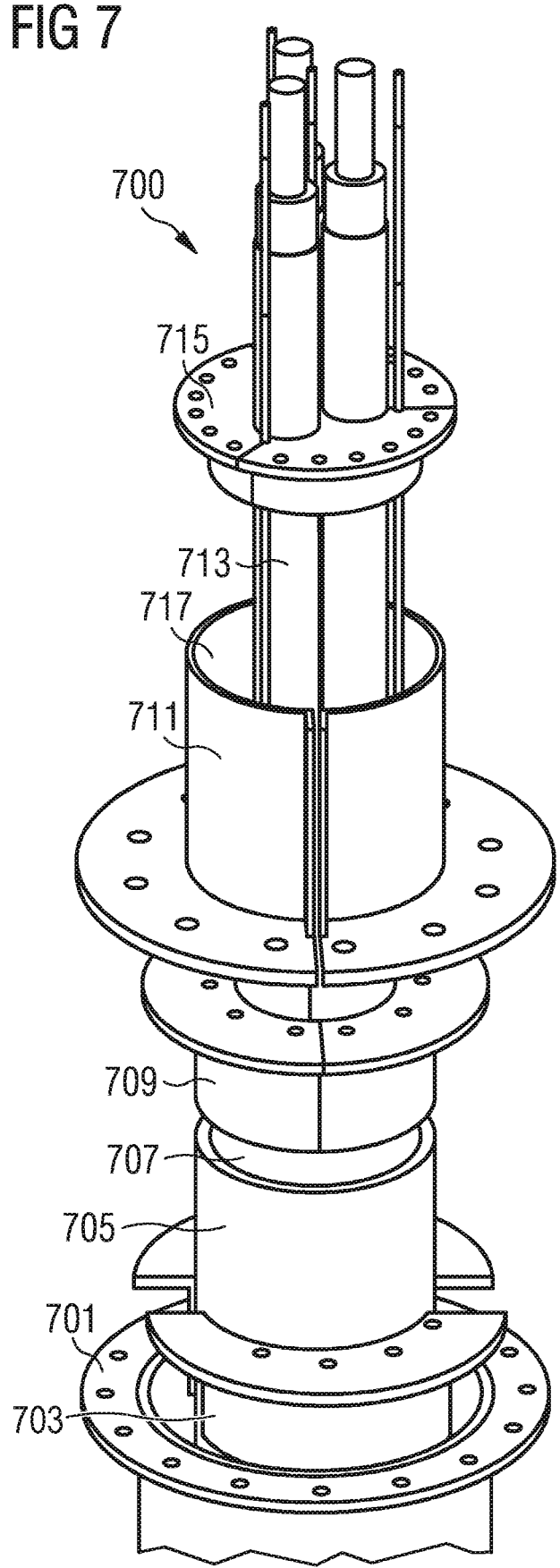
FIG. 7 shows a hang-off system according to an embodiment of the present invention.

In FIG. 7, a hang-off system 700 according to an embodiment of the present invention is shown. The hang-off system 700 comprises an interface according to an embodiment. The interface of the hang-off system 700 comprises a connector 703 that is configured to be brought into engagement with a cable support 701 and a shell in which a cable 707 is arranged. The connector 703 may comprise a mechanical clamping element that provides for a clamping force, that minimizes a movement of the shell in the connector 703.

The cable support 701 may be arranged at a receiving structure, such as a floating substation to be electrically connected to an offshore wind turbine.

Optionally, the hang-off system 700 comprises an extension element 705, which provides a space in which the cable 707 can move when a load is applied on the cable.

Further, the hang-off system 700 comprises a lower seal 709, a chamber element 711, each consisting of two parts, and an upper seal 715. The upper seal 715 is configured to positively fit with an inner core 713 of the cable 707.

The chamber element 711 is configured to form a gas chamber 717 between the inner core 713 and an inner surface of the chamber element 711, together with the upper seal 715 and the lower seal 709.

The hang-off system 700 may comprise any cable for transmitting electrical power, such as an unarmored three-phase cable, for example. The hang-off system 700 may be part of a receiving system such as an offshore wind turbine generator, a substation or any other offshore structure. In particular, as the inner core 713 of the cable 707 may move relative to the cable support 701, the hang-off system 700 may be used to connect floating structures with other structures, such as non-floating substations, for example. Thus, the hang-off system 700 may be used to compensate or tolerate a relative movement between a floating structure and a non-floating structure.

The connector 703 of the hang-off system 700 may comprise a shell connection area for connection with a shell of the cable 707 in order to fix the shell at the connector 703. The shell connection area may be configured to be welded to the shell.

Further, the connection area, which may be a circular flat element providing receptors for fasteners, such as screws or bolts, can be used to connect the cable 707 with the cable support 701.

The fasteners used for connecting the cable 707 with the cable support 701 may extend through the shell connection area of the connector 703 only or through a plurality of elements of the cable 707, such as the chamber elements 711 and/or the upper seal 715 and/or the lower seal 709.

By using the lower seal 709, the shell of the cable 707 may be clamped in the connector 703.

As the connector 703 is fixed to the cable support 701 and the shell of the cable 707 is welded to or clamped in the connector 703, the shell is also fixed with respect to the cable support 701.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An interface for connecting a cable arranged in a shell to a receiving structure, the interface comprising:
   a connector having a connection area for fixing the connector to a cable support of the receiving structure and a transmission area for receiving the cable and the shell;
   a lower seal;
   an upper seal;
   a chamber element configured to coat the cable between the lower seal and the upper seal;
   wherein the chamber element is configured to form a gas chamber between an inner core of the cable and an inner surface of the chamber element for collecting gases streaming out of the cable;
   wherein the lower seal is configured to seal a space between an outer surface of the cable and the shell; and
   wherein the upper seal is configured to seal a space between a sealing area on the inner surface of the chamber element above the gas chamber and the inner core of the cable.

2. The interface according to claim 1, wherein the upper seal is shaped to connect with the inner core of the cable in a positive form locking and sealing connection.

3. The interface according to claim 1, wherein the interface comprises a mechanical clamping element configured to be arranged between the shell in which the cable is arranged and the connector and configured to provide for a clamping force to minimize movement of the shell in the connector.

4. The interface according to claim 1, wherein the chamber element is configured to envelop both a first part of the cable, where an outer layer of the cable is present, and a second part of the cable, where the outer layer of the cable is stripped off and only the inner core of the cable is present.

5. The interface according to claim 1, wherein at least one of the upper seal and the lower seal are configured to extend in a linear direction in a mounting stage, when there is no compression force applied on the particular seal and to extend further in a radial direction than in the mounting stage when a compression force is applied on the particular seal.

6. The interface according to claim 1, wherein the upper seal and/or the lower seal each comprise receiving sections for receiving compression elements that apply a compression force on the upper seal and/or the lower seal to expand the upper seal and/or the lower seal further in a radial direction.

7. The interface according to claim 1, wherein at least one, each of the connector, the lower seal, the upper seal and the chamber element includes at least a first part and a second part that are configured to be reversibly disassembled.

8. The interface according to claim 1, wherein the interface comprises an extension element for connecting with a floating structure, wherein the extension element is configured to be arranged between the chamber element and the connector to provide for a space in which the cable can move when a load is applied on the cable.

9. The interface according to claim 8, wherein the extension element comprises at least one stopper for stopping movement of the cable relative to the extension element.

10. The interface according to claim 1, wherein the chamber element comprises an access interface, wherein the access interface is one of a plug, a valve or a membrane, for transmission of gas out of the gas chamber.

11. The interface according to claim 10, wherein the interface comprises a storage system for storing gas or a ventilation system for venting gas out in an environment, wherein the storage system or the ventilation system is connected to the access interface by a connection system.

12. A method for connecting a cable arranged in a shell to a receiving structure, the method comprising the following steps:
   inserting the cable together with the shell into a cable support of the receiving structure;
   fixing a connector surrounding the cable at the cable support,
   arranging a lower seal between the shell and an outer surface of the cable;
   forming a gas chamber between an inner core of the cable and an inner surface of a chamber element for collecting gases streaming out of the cable by arranging the chamber element in an area of the cable above the lower seal; and
   arranging an upper seal between a sealing area on the inner surface of the chamber element above the gas chamber and the inner core of the cable.

13. The method according to claim 12, wherein the method further comprises fixing the connector at the shell of the cable.

14. A hang-off system for connecting a number of elements, the hang-off system comprising:
   an interface according to claim 1, a cable arranged in the interface.

15. The hang-off system according to claim 14, wherein the cable is selected from the following list of cables:
   unarmored multicore cable, three phase electricity cable, umbilical cable and unarmored umbilical cable.

* * * * *